United States Patent
Oelke et al.

[15] 3,637,362
[45] Jan. 25, 1972

[54] METHOD AND APPARATUS FOR HEAT-TREATING GLASS SHEETS

[72] Inventors: Waldemar W. Oelke, Rossford; Thomas B. O'Connell, Toledo; Richard A. Herrington, Millbury, all of Ohio

[73] Assignee: Libbey-Owens-Ford Company, Toledo, Ohio

[22] Filed: Sept. 16, 1968

[21] Appl. No.: 759,976

[52] U.S. Cl. ..................................65/25 A, 65/104, 65/111, 65/117, 65/182 A, 65/348
[51] Int. Cl. .........................................................C03b 25/00
[58] Field of Search ..............65/25 A, 104, 111, 120, 182 A, 65/273, 274, 114, 117, 348, 349, 350, 351

[56] References Cited

UNITED STATES PATENTS

| | | | |
|---|---|---|---|
| 1,622,817 | 3/1927 | Waldron | 65/182 A X |
| 3,293,022 | 12/1966 | Beattie | 65/374 X |
| 3,425,818 | 2/1969 | Plumat | 65/25 A X |
| 3,488,178 | 1/1970 | Welker et al. | 65/104 X |

Primary Examiner—Arthur D. Kellogg
Attorney—Collins & Oberlin

[57] ABSTRACT

This application discloses a method and apparatus for heating glass sheets to an elevated temperature while they are supported, preferably in a substantially vertical plane, with one surface against a cushion of air and moved in a generally continuous manner through a substantially enclosed tunnel. The apparatus includes apertured panels located within the tunnel at either side of the path of travel of the glass, and through which panels heating and supporting gases are directed toward the glass surfaces; aspirating means for recovering and recirculating the gases; and special designs and patterns of apertures for the panels, at least one of which has improved heat reflecting characteristics.

10 Claims, 6 Drawing Figures

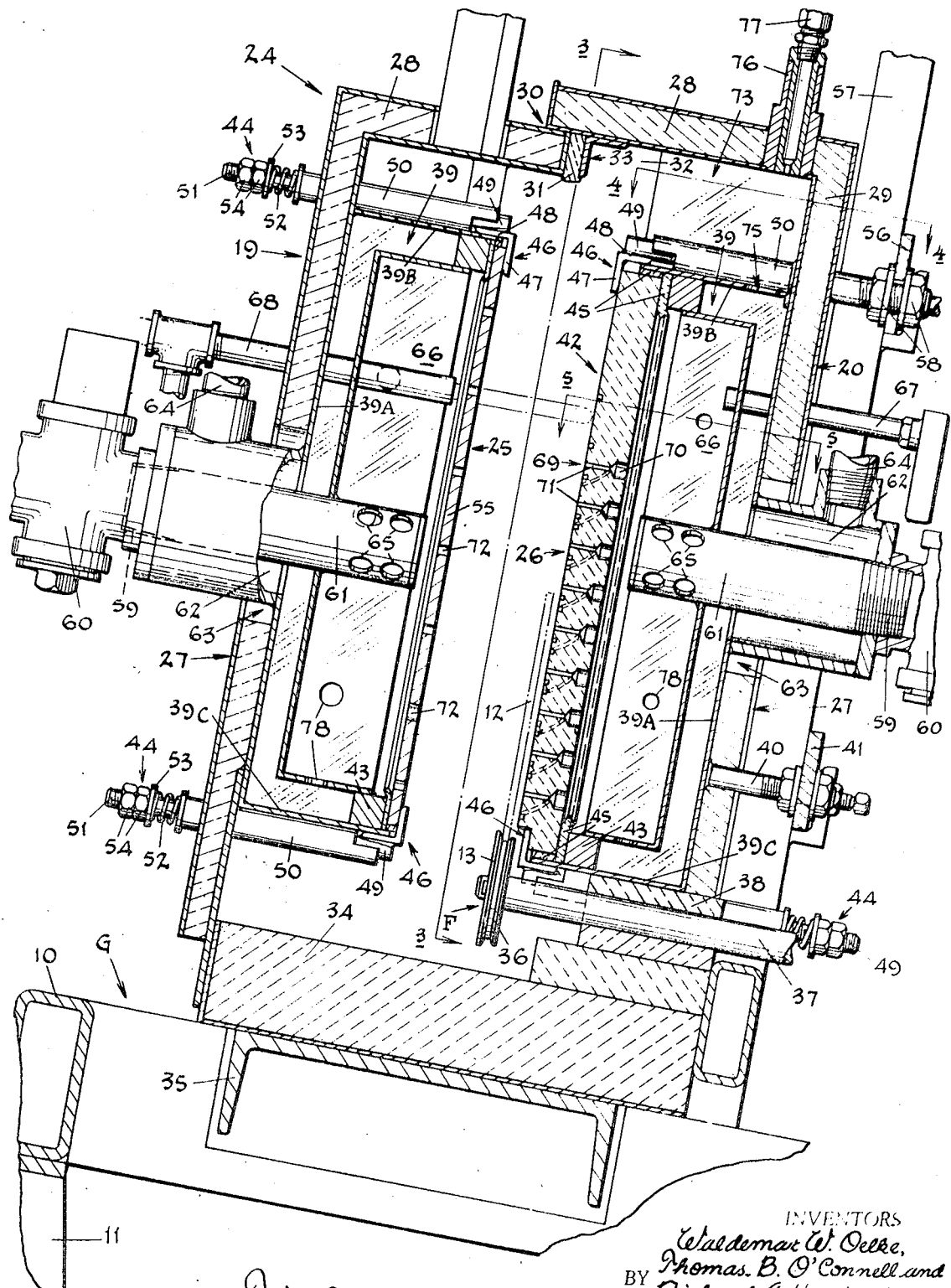

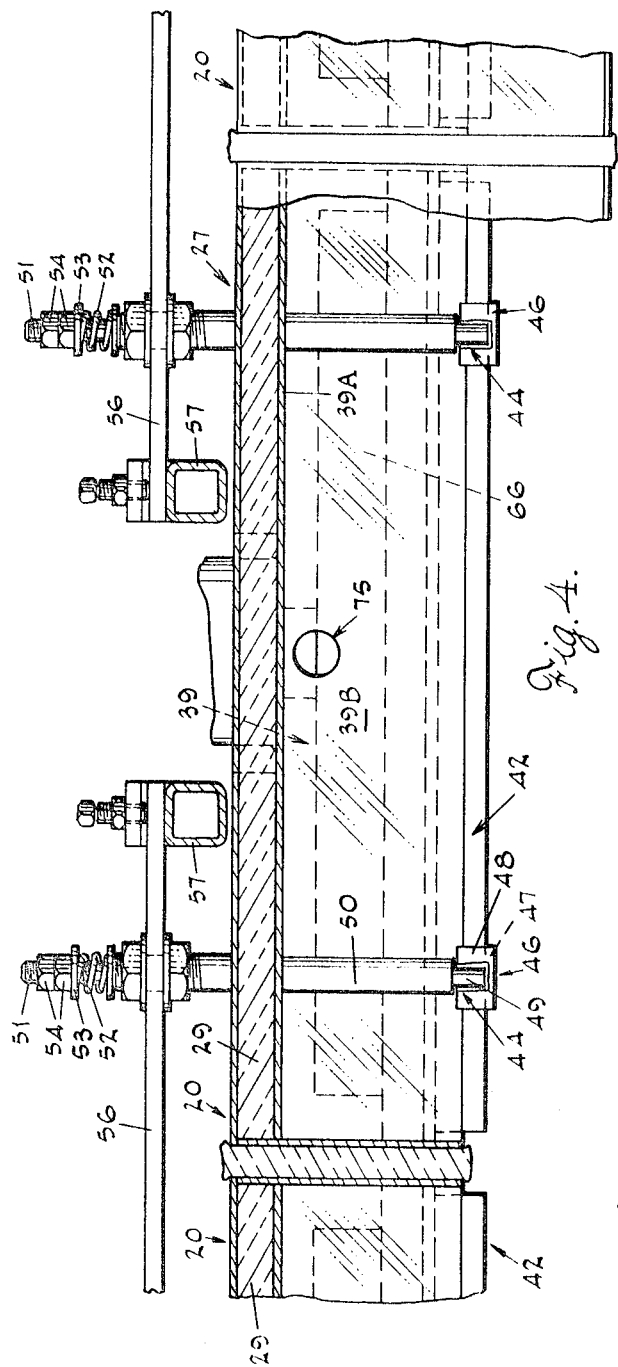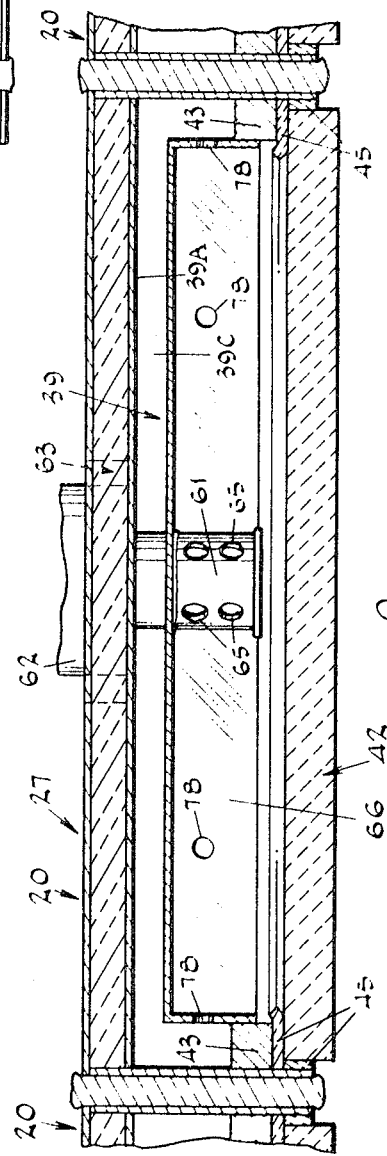

3,637,362

METHOD AND APPARATUS FOR HEAT-TREATING GLASS SHEETS

BACKGROUND OF THE INVENTION

1. Field of the Invention

The present invention relates broadly to the heat treatment of sheet material such as glass and more particularly to improved procedures and apparatus for supporting and heating the sheets during such treatment.

2. Description of the Prior Art

As is well known, many different processing and fabricating procedures, currently followed in the commercial production of a wide variety of articles from glass sheets or plates, involve heating the sheets to elevated temperatures substantially at or closely approaching the softening point of the glass.

For example, glass sheets may be strengthened, and so made less susceptible to damage from impact or rough handling, by a heat treatment known as tempering, which consists in first heating the sheets to approximately their point of softening, to remove thermal stresses therein, and then rapidly chilling them to place their outer surfaces under compression and their interiors in tension. When so tempered, the glass sheets are not only considerably stronger and more resistant to impact but they have their breaking characteristics so altered that if and when broken they will disintegrate into small relatively harmless particles.

At the present time such tempered glass sheets are in large demand for use as glazing closures in vehicles such as automobiles, trucks and the like for the protection of the occupants of the vehicle; and, in addition, the modern day trend being followed by substantially all producers of automobiles utilizes curved glazing closures which require that the sheets be bent to a very precise curvature.

Such bending, whether or not combined with a tempering treatment, is another procedure which requires that the glass be heated to elevated temperatures, which may be identified as the deformation temperature of the glass, i.e., that temperature at which the sheet softens sufficiently to permit it to be readily shaped to the desired configuration.

The wide use of bent and/or tempered glass sheets by the automobile industry renders it imperative that commercial production procedures and apparatus be capable of producing finished sheets of the processed glass in large numbers and, therefore, in a substantially continuous manner; and equally imperative that they be capable of producing glass sheets bent to the precisely defined curvatures, and/or tempered, without marring the heated and softened major areas of the sheets which will become the viewing areas in the completed glazing closures.

To this end it has previously been suggested that glass sheets, during heat treatment, be more or less floated on a cushion of gas which also acts to heat the glass.

However, a number of difficulties have arisen in attempting to put this concept into practice in commercial production. For example, the available supply of air and gas for supporting and heating the glass sheets is not always sufficient; obtaining uniform heating is also a problem, especially where supporting the glass sheets in a vertical plane creates a stack effect; and the apparatus heretofore available has been found to be generally inefficient in operation.

SUMMARY

According to the present invention the above problems are substantially overcome if not entirely eliminated, and a remarkably efficient heat treatment of the glass sheets is attained by the provision of improved techniques and apparatus for directing gas toward surfaces of glass sheets moving along a predetermined path, to heat the same and to provide a cushion against which said sheets can be supported, and for recovering and recirculating the gas so directed.

BRIEF DESCRIPTION OF THE DRAWINGS

In the drawings, wherein like numerals are employed to designate like parts throughout:

FIG. 2 is a sectional view taken along line 2—2 in FIG. 1;

FIG. 4 is a sectional view taken along line 4—4 in FIG. 2;

FIG. 5 is a sectional view taken along line 5—5 in FIG. 2; and

DESCRIPTION OF THE PREFERRED EMBODIMENTS

Figure 1:
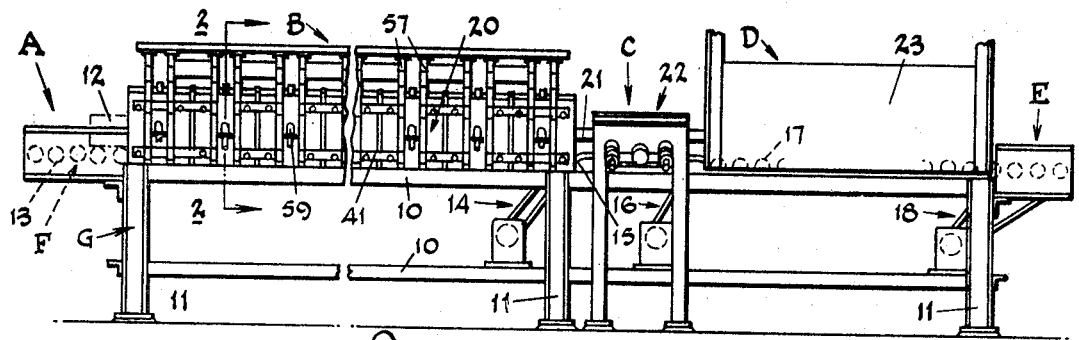
FIG. 1 is a fragmentary side elevation of a heat-treating apparatus embodying the novel features of the present invention.

Referring now more particularly to the drawings, there has been illustrated in FIG. 1 an apparatus for heating, bending and tempering glass sheets by a continuous process and through which vertically arranged glass sheets are supported and moved successively from a loading zone A, through a heating area B, a bending area C, and a tempering area D, to an exit zone E. All of these zones and areas are contiguous and arranged end to end so that a sheet, upon leaving one, passes immediately into and through the following zone or area on a conveyor system F.

This apparatus, which is mounted on a support frame G made up of support beams 10 fixed to upstanding pedestals 11 at opposite sides of the path, is designed to heattreat glass sheets in the production of curved tempered sheets such as are used in automotive side lights and back lights. In operating the apparatus, vertically arranged and supported glass sheets 12 are first moved from the loading zone A into the area B wherein they are heated to the elevated temperature required to bend and subsequently temper them. Immediately after completion of the heating phase the sheets are moved into the area C, where they are subjected to the bending phase, after which they are moved once more immediately into the area D in which the chilling phase of the tempering treatment is performed. In this way the heat imparted to the sheets in the area B is utilized in both the bending and tempering phases of the operation.

To carry out the necessary movement, the illustrated apparatus includes the conveyor system F that is operable to move the sheets 12 from left to right in FIG. 1 from the loading zone A to the exit zone E in a generally continuous manner.

The conveyor system F is divided into three segments so that the sheets 12 may be moved in a manner commensurate with the phase of the operation being performed in each of the processing areas. Thus, sheets are moved through the loading zone A and heating area B by a first conveyor segment 13 driven by a suitable drive means 14. As the heated sheets emerge from the heating section B, they are received on a second conveyor segment 15 which moves them into the bending area C and, after the sheets are bent, to the cooling area D. This conveyor segment 15 is driven by a drive mechanism 16 operable to effect intermittent operation of this conveyor segment and thus permitting the movement of the sheets to be interrupted during the actual bending process. The sheets 12 are then carried through the cooling area D and into the unloading zone E by a third conveyor segment 17 aligned with the first two segments and completing the overall conveyor system F. The segment 17 is driven by a third independently operated drive means 18 that is operable to move the sheets at a speed commensurate with the temperature desired in the glass.

As has been pointed out above, glass sheets intended for use as glazing closures must be of high optical quality and any distortion or defects in their surfaces which would interfere with vision through the sheets will render them unacceptable for their intended purpose. Any physical contact with the surfaces of the sheets while they are in a heat softened condition gives rise to the possibility that the sheets will be distorted and that their surfaces will be scuffed or marred by the equipment utilized in their processing.

To maintain the aforementioned defects at a minimum, the apparatus of the present invention is designed to process the sheets in an automatic manner that requires a minimum of handling during processing and, further, to so support the sheets during processing as to reduce physical contact between the sheets and the processing apparatus to a minimum.

To this end, according to the invention, the sheets 12 are balanced on one edge on the conveyor system F in a manner to substantially eliminate or completely avoid any nonessential contact with the major areas of the glass which are to comprise the viewing area of the final and completed glazing closure. Specifically the sheets 12, throughout their processing, are either balanced against a cushion of air or against guiding arrangements which contact a very small portion of the sheet with just sufficient force to maintain them in a balanced condition on the conveyor segments. Moreover, by inclining portions of the apparatus slightly from the vertical in the manner shown in FIG. 2, surface contact between the sheets and any mechanical guiding arrangements may be limited to one side of the sheets.

As indicated above, within the heating area B, the glass sheets 12 are both heated and supported in a balanced, substantially vertical position by heated gases directed thereagainst through apertured plates located at opposite sides thereof. More specifically, a preferred form of combined heating and supporting apparatus for the area B comprises, in the illustrated embodiment, opposed heating cells 19 and 20 disposed on opposite sides of the path of travel for the sheets 12 that is defined by the conveyor system F (FIG. 2). These cells are operable to direct heated gases against the surfaces of the sheets to heat the same and to balance them in substantially vertical, or in the slightly inclined position as shown. In order that the sheets 12 may be brought to proper bending temperature progressively so as to avoid damage due to thermal shock, series of the individual heating cells 19 and 20 are preferably utilized at each side and, as can be seen in FIGS. 4 and 5, are disposed along the path of movement of the sheets with expansion seals therebetween. Each of the individual cells is separately controlled enabling the establishing of a desired temperature gradient.

After being heated and upon emerging from between the series of heating cells 19 and 20, the sheets 12 are received on the second conveyor segment 15 which like the first segment 13, contacts only the lowermost edge of the glass. However, in the area C, the upper marginal portion on the lower of the two sides of the sheet 12 slides along a guide bar 21 extending through the bending area. The conveyor segment 15 brings the sheet into proper position relative to a bending mold 22 located in the area C whereupon movement of the sheet is interrupted for a length of time sufficient to permit the sheet to be bent.

Preferably, a press bending technique is utilized in the area C wherein the sheet is formed to the desired curvature by being pressed between complemental male and female shaping surfaces forming part of the complete mold 22, which mold may comprise opposed mold parts movable toward and away from the path of movement of the sheets between an open position that will permit the sheets to enter between the mold parts and a closed position wherein the mold parts are in pressing engagement with the opposite surfaces of the sheets.

After the sheets are bent, the conveyor segment moves them out of the bending area C and onto the third conveyor segment 17 which carries them into and through the chilling area D. In this area the cooling means may comprise suitable blast heads or the like 23 which are operable to direct opposed flows of a cooling medium such as air against the opposite surfaces of the sheet to quench or rapidly chill the sheet to a temperature below the annealing range of the glass.

As has been heretofore brought out, the present invention is primarily concerned with the heating phase of the operation. Thus, the bending and cooling apparatus are shown as part of the illustrative embodiment only and it will be readily appreciated that any suitable bending means could be utilized, with or without chilling means, or that the bending means could be completely eliminated where only tempering of the glass sheets is required. Similarly, the cooling means could be any structure operable to quench the heated glass sheets and balance them in a substantially vertical plane.

The invention then, contemplates primarily the provision of an improved process and apparatus for heating glass sheets by directing flows of heated gases against their surfaces to heat the same, and/or to balance or support the sheets, preferably on edge, on a conveyor; and is basically concerned with a more efficient process for supporting and heating glass sheets.

To this end, in accordance with the illustrated embodiment of the invention, the sheets are preferably moved through a closed tunnel 24 (FIG. 2) created between the series of individual heating cells 19 and 20 disposed adjacent their path of travel and which cells have working faces 25 and 26 respectively, upstanding from the path and lying in planes parallel to the plane in which the sheet is to be supported. The individual cells are disposed side by side along the path and each comprises an outer housing 27 having top and back walls 28 and 29 respectively formed of metal plated refractory sheets with the top walls 28 of opposite cells overlapping as at 30 to form the roof of the closed tunnel or chamber 24 with a suitable insulating sealing material 31 forming a seal at their junction.

As illustrated, the outer casing or housing 27 of each cell 20, which as shown in FIG. 2 is the lowermost of the opposed cells, is slightly taller than the outer housing of the uppermost cell 19 so as to telescope over the top wall of the uppermost cell at 30 with a relatively close fit. An angle iron member 32, having a depending leg 33, is affixed to the inner metal clad surface of the taller of the housings so as to establish the relative position between the housings and the sealing material or gasket 31 is disposed between the end of the housing on the upper cell and the angle iron leg 33 to seal the joint between the top walls 28. The bottom wall of the tunnel or chamber 24 is comprised of a refractory slab 34 extending between the rear walls 29 of the outer housing 27 of each of the upper and lower cells and rests on a channel iron 35 supported by the framework G.

Within the area B, the rollers 36 making up the first conveyor segment 13 are affixed to the innermost ends of shafts 37 projecting through and bushed in a refractory block 38 forming a portion of the rear wall 29 of the outer housing 27 of the lowermost cell 20. To aid in guiding the sheets 12 along a proper path, the rollers 36 may be grooved in their outer periphery to receive the lowermost edge of the sheets.

Considering first the lowermost cells 20 which, for purposes of identification, will hereinafter be referred to as the flotation cells since, in this structure, they provide the cushion of gases against which the sheet is balanced on its lower edge throughout its movement through the heating section of the apparatus. Each of these flotation cells includes, within its casing 27, a float pan 39 of open boxlike construction having a rear wall 39A, sidewalls and top and bottom walls 39B and 39C respectively, and an open front facing the path of travel of the glass. This pan 39, which encloses the mold cavity, carries stub shafts 40, affixed at their inner end to the backwall 39A of the pan and threaded at their opposite ends which project through and are secured to horizontal support bars 41 carried by upright support members on the side rails of the support frame G (FIGS. 1 and 2).

To permit streams of heating and supporting gases to be directed against the lowermost surfaces of the sheets 12 as they move through the heating area B, the open face of the flotation pan 39 is closed by an apertured panel 42 which provides the working face 26 of the cell 20. The panel 42, is shown as mounted against a continuous internal collar 43 in the pan 39 and is retained in position thereagainst by a plurality of clamping means 44 which, with packing material 45, provide a tight joint between the periphery of the panel and the pan.

Each of the clamping means 44 includes an L-shaped retaining member 46 having one leg 47 extending along the working face 26 of the panel 42 and the other leg 48, extending along the top or bottom wall of the pan 39. One end of a rod 49 is fixed to the leg 48 and projects therefrom through an elongated sleeve 50, secured to the upper or lower wall of the pan, and terminates in a threaded extension 51 beyond the outer end of the sleeve (FIG. 4). A coil spring 52, telescoped on the extension 51 of the rod, acts between the outer end of the sleeve 50 and a washer 53, held on the rod by locknuts 54 threaded on the extension 51, to urge the leg 47 of the retention member against the working face 26 of the panel 42.

The uppermost cells 19 are similar in construction to the lowermost cells 20 and their similar parts have been designated by the same numerals. However because, in the illustrated embodiment, the cells 19 serve only as heating cells and not as flotation cells, the panels 55 which close the open face of the pans 39 of these cells is of different construction as will be more clearly hereinafter explained. Also, while the clamping means 44 for the panels of both cells 19 and 20 may also act to at least partially locate and support the pans 39 thereof from the backwalls 29 of their respective outer housings 27, the upper clamping means 44 of the cells 20 additionally act to lock the structure to upper horizontal bars 56 carried by the uprights 57 by means of nuts 58.

Combustible gases are brought to the heating section B from a source (not shown) through supply pipes 59 and the flow of combustible gas into each of the cells 19 and 20 is regulated by valves 60 in the pipes. The inner end of each pipe 59 is coupled to a burner tube 61 which projects therefrom, through a chamber 62 mounted in an opening 63 formed in the rear walls 27 and 39A, and terminates in a closed end adjacent the back of the apertured panel in the cell. A pipe 64 supplies air to the chamber 62 to cool the burner tube 61 which is provided with a plurality of ports 65 circumferentially spaced apart around its inner end portion and from which flames radiate outwardly from the tube into an open inner pan 66 which surrounds the port area of the burner tube 61 and fits into the collar 43 with its opening side facing the apertured panel. The flames emitting from the burner tube 61 heat the interior of the pan 66, and the highly heated air therein and the products of combustion flow outwardly through the apertures in the panel to heat the glass sheets 12.

The pressure of the hot gases within each cell is dependent on the pressure of the gas from the burner tube 61 and the amount of hot air, escaping through the apertures of the panels to heat the glass and create an air cushion against which the glass sheets are more or less freely supported, depends upon the pressure maintained in the cell which pressure is controlled by regulation of the gas pressure.

To aid in maintaining a constant pressure of the desired magnitude and in maintaining the desired temperature within each heating cell, pressure and temperature measuring devices such as manometers and thermocouples may be provided in suitable locations as indicated at 67 and 68.

Figure 3:
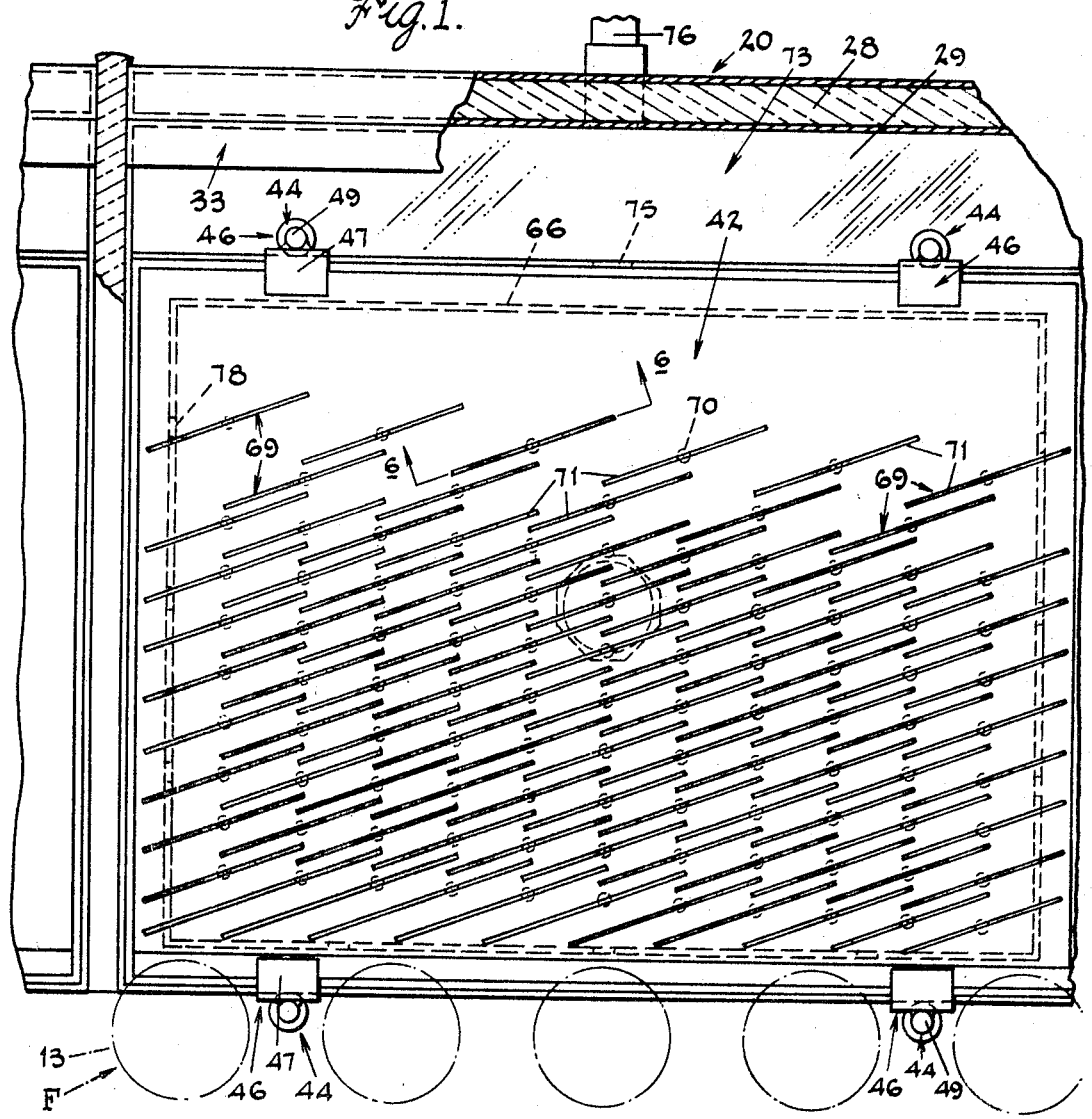
FIG. 3 is a view of one of the flotation faces taken along line 3—3 in FIG. 2.
Figure 6:
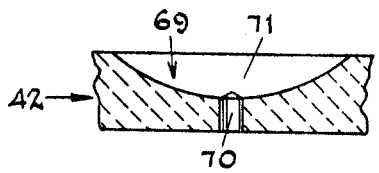
FIG. 6 is a fragmentary, sectional view taken along line 6—6 in FIG. 3.

Because, as indicated above, the cells 20 function as flotation as well as heating cells, the composition of and the form and arrangement of apertures in the panels 42 thereof are of considerable importance. Thus, these panels are preferably made of stone or a refractory material which, for example, may be composed almost entirely of fused silica. As best shown in FIGS. 3 and 6 the apertures 69 therein are preferably shaped to provide cylindrical passages 70 opening from the rear face, and slots 71 opening to the front or working face 26, of the panels; and the slots 71 are arranged at an angle to the path of travel of the glass and in an overlapping pattern to insure uniform distribution of the gases emitted therefrom and obviate the creation of processing lines on the surface of the glass sheets.

As can be seen in FIG. 6 the slot portions 71 of the apertures 69 are formed by arcuate cuts that intersect the cylindrical passages 70 thereof and these slot portions of the apertures act to spread the emitted gases over a relatively wide area and eliminate distortion and marking of the glass that would result from direct impingement by streams of gas from the more restricted passages 70.

It will also be noted that the centerlines of the apertures 69 are illustrated as arranged in vertical rows and in rows at an angle to the horizontal that inclines upwardly in the direction of glass movement; that the slots for the lowermost row of apertures are longer than the others; and that the rows of apertures stop somewhat short of the top of the panels. This is done to obtain maximum flotation as well as heating coverage for the sizes and shapes of glass to be processed.

On the other hand, since the cells 19 in the illustrated embodiments of the invention function primarily only as heating cells, the panels 55 thereof may be, and preferably are of a different construction from the panels 42. Thus, the panels 55 are here shown in the form of plates of steel or other material having good heat transmitting and reflecting characteristics and the apertures 72 therein are of a conventional shape and arranged in a conventional pattern designed to direct heated gases toward the sheets moving therepast in a manner to effectively and uniformly heat the glass to the desired temperatures.

Perhaps the most important feature of the present invention lies in the fact that it utilizes an aspirating air principle to increase the amount of flotation air flowing through the working faces of the panels of at least one series of the heating cells. According to this principle the heated air or gases emitted from the faces 26 of the flotation cells 20, for example, are collected and recirculated back into the cavities of the cells to thereby greatly increase their efficiency.

Specifically, in the illustrated embodiment, each cell 20 is so constructed as to provide above the cell cavity a chamber 73, formed by the top and backwalls 28 and 29 respectively of the outer housing 27 and the top wall 39B of the pan 39, and which is in open communication with the tunnel between the working faces 25 and 26 through which the sheets 12 move and also communicates with the space 74 formed between the inner and outer pans 66 and 39 through a hole 75 in the top wall 39B of the outer pan 39.

To provide the aspirating air a pipe 76, which may be of venturi construction and with an outlet orifice that can vary between about one-eighth and three-eighths inch in diameter, is fitted through an opening in the top wall 28 directly above and in alignment with the hole 75 in the top wall 39B. Air, under relative high pressure, for example at 30 p.s.i. with a ⅛-inch or 5 p.s.i. with a ⅜-inch orifice, is supplied through a fixture 77 from a source (not shown) to the pipe 76 and is directed thereby through the chamber 73 and into the space 74 between the pans. As a result, ambient air within the tunnel between the working faces 25 and 26, and including the hot gases directed from the face 26 of the cell 20, will be drawn upwardly, through the chamber 73, and into the high-pressure airstream from the pipe 76. In the stream it will be carried through the hole 75 into the space 74 between the pans and recirculated to the inner pan 66 through openings 78 in the walls thereof and thence to the apertures 69 in the panel 42.

This recovery and recirculation of the heated gases not only increases the available amount of flotation air in the cavities of the cells 20 but further increases their efficiency by better distribution of the heating and flotation air directed against the glass sheets and obviates and/or controls the troublesome stack effect normally encountered in heating vertically positioned glass sheets. Also, it is to be understood that the aspirating air principle can be as well applied to the cells 19 although it is particularly advantageous with the flotation cells 20 where the fact that the gases directed from the working faces 26 must support as well as heat the glass presents greater problems and requires greater volumes of air.

In operation, glass sheets 12 moving through the heating area B of the illustrated embodiment on the conveyor segment 13 (FIG. 2) will have their lower edges supported on the rollers 36. At the same time they will be supported or balanced in the desired substantially vertical position against the streams of heated gases directed outwardly against their lowermost surfaces from the working faces 26; and these streams of gases, together with the radiated heat and similar streams of gas directed against the uppermost surfaces of the sheets from the working faces 25, will also act to gradually and uniformly heat the glass as it passes through the area B to the temperature required for the subsequent processing operations.

Thus, here, where the gases in the cells 19 may be heated to approximately 1,350° F. and those in the cells 20 to approximately 900° F., when the glass sheets 12 pass from the heating area B into the bending area C they will be at their deformation temperature, or around 1,150° F., and will be bent to the desired shape in the bending mold 22; then as they pass from the area C into the area D, they will still be at a sufficiently high temperature, around 1,130° F., to be tempered by blasts of chilling or quenching air directed against their opposite surfaces by the blast heads 23.

As an indication of the effectiveness of the aspirating principle of this invention, it has been found in actual practice that the gases issuing from the cells 20 can be maintained at the indicated 900° F., without firing the burners 61 therein, due to the aspiration into the cells 20 of heated gases produced in the cells 19.

While, as pointed out above, the blast heads 23 may be of a conventional construction it should be understood that they can as well be of a construction similar to that of the heating cells 19 and 20 and may employ the aspirating air principle of the invention with this or distinctly different cell or blast head structures.

Finally, while in the particular embodiment of the invention herein shown and described, the glass sheets are supported in a substantially vertical plane, it will be apparent that the air aspirating principle disclosed is also applicable to heat treating apparatus in which the glass sheets are located for treatment in any plane between the true vertical and the true horizontal planes although, generally speaking, in supporting the glass sheets at an angle only slightly off the horizontal it may be desirable to employ lower pressures for the aspirating air, for example around 10 p.s.i., and to introduce it at or close to the working face of the flotation panel.

In any event the aspirating air principle employed in recovering, increasing and recirculating the treating air or gases remains essentially the same in all of the suggested modifications and it is to be understood that the forms of the invention herewith shown and described are to be taken as illustrative embodiments only of the same, and that various changes in the shape, size and arrangement of parts, as well as various procedural and compositional changes may be restored to without departing from the spirit of the invention as defined in the following claims.

We claim:

1. In a method of treating and supporting a sheet, while it is positioned at an angle between the horizontal and vertical and over and in spaced relation to a treating cell having a cavity, introducing gas under pressure from a primary source into said cavity end by directing streams of gas from the working face of an apertured panel closing said cell cavity substantially normally against the lowermost surface of said sheet to treat and support the same in said position; the improvement which comprises recovering and recirculating the gas from said streams by aspirating a stream of relatively high-pressure air from a secondary source into said cell cavity, through an area communicating with the space between said panel and said sheet, to draw said gas into said high-pressure airstream and return it to said cell cavity.

2. A method as defined in claim 1, in which said sheet is positioned in and moved through a substantially enclosed tunnel, one wall of which is defined by a series of said panels on a series of said cells, and a stream of said high-pressure air is aspirated into the cavity of each of said cells through a chamber which communicates with said tunnel.

3. A method as defined in claim 2, in which said sheet is a sheet of glass positioned in a substantially vertical plane, the opposite wall of said tunnel is defined by a second series of apertured cover panels for the cavities of a second series of cells, said sheet is heated to substantially the point of softening of the glass by streams of hot gas directed against opposite surfaces thereof from the working faces of said first and second series of apertured cover panels and by heat radiated thereto from at least said second series of panels, and said sheet is further processed while in said heated condition as it moves out of and beyond said substantially closed tunnel.

4. In apparatus for supporting and heat treating a glass sheet and which includes a cell having a cavity, an apertured panel covering said cavity means for introducing air into said cavity from a primary source, to discharge streams of air from said cell cavity through the apertures in said panel at a pressure to support said glass sheet in spaced substantially parallel relation to said panel; the improvement comprising separate means for supplying and directing a stream of aspirating air into said cell cavity at a point and at a pressure to draw ambient air from the space between said glass sheet and said panel into said stream of aspirating air to return it to said cell cavity.

5. Apparatus as defined in claim 4 in which said cell is one of a series of such cells arranged by side-by-side relation with the panels thereof at a slight angle to the vertical and defining the lowermost sidewall of a tunnel, a second series of similar cells is positioned in opposed relation to said first series and with their apertured cover panels defining the uppermost sidewall of said tunnel, means are provided for closing the top and bottom walls of said tunnel and for creating chambers in open communication with the interior of said tunnel and with the cavities of each said first series of cells, and said air aspirating means is one of a series of such means similarly associated with each of said first mentioned series of cells for directing streams of said aspirating air into the cavities of the same through said chambers.

6. Apparatus as defined in claim 5 in which the cover panels for said second series of cells are of heat reflective material, and the cells of both series include burner tubes extending into the cavities thereof toward said cover panels and having flame ports adjacent their inner ends, and means for providing a combustible gas to said burners at controlled pressures.

7. Apparatus as defined in claim 6 in which said cells also include inner pans in said mold cavities and spaced from the walls thereof and in surrounding relation to the port areas of said burners and with the open sides of said pans facing said cover panels and closed sides thereof being provided with openings therein, and said air aspirating means are positioned to direct the airstreams therefrom into the space in said cell cavities outside said inner pans.

8. Apparatus as defined in claim 7 which also includes conveyor means for supporting glass sheets on edge within said tunnel and for moving the same therethrough, means for resiliently clamping said cover panels on said cells, and means for supplying cooling air to said burner tubes outwardly of said port area thereof.

9. In apparatus for heat-treating glass sheets including means for moving said sheets along a defined path and a treating cell located along said path and having a cavity, an apertured panel closing said cavity and having a working face positioned to direct gases from said cavity toward the surface of a glass sheet moving along said path, the apertures in said panel comprising passages leading into the panel from the surface thereof opposite said working face, elongated slots cut arcuately into said working face and intersecting and curving outwardly from said passages toward said working face whereby the depth of said slot decreases outwardly from said passages and toward said working face to provide curved bottoms in said slots at either side of said passages, and said slots being arranged in spaced vertical rows across said panel and in spaced horizontal rows inclined upwardly in the direction of said path with the slots in adjacent rows in overlapping relationship.

10. In apparatus for heattreating glass sheets, the combination, with a burner tube contained within a chamber having a forward face constructed with spaced ports for applying gas between said forward face and a glass sheet to be treated at a pressure sufficient to support and heat said sheet, of aspirating means mounted in a manner relative thereto to attain a return flow of the exhaust gasses to said burner chamber.

* * * * *